US006721565B1

(12) United States Patent
Ejzak et al.

(10) Patent No.: US 6,721,565 B1
(45) Date of Patent: Apr. 13, 2004

(54) HANDOVER OF WIRELESS CALLS BETWEEN SYSTEMS SUPPORTING CIRCUIT AND PACKET CALL MODELS

(75) Inventors: Richard Paul Ejzak, Wheaton, IL (US); John Matthew Gafrick, Naperville, IL (US); Harold Aaron Lassers, Elmhurst, IL (US); Ronald Bruce Martin, Carol Stream, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 445 days.

(21) Appl. No.: 09/632,814

(22) Filed: Aug. 7, 2000

(51) Int. Cl.[7] ................................................. H04Q 7/00
(52) U.S. Cl. ....................................... 455/436; 370/331
(58) Field of Search ................................. 455/436, 438, 455/439, 440, 442, 444; 370/331, 332, 328, 338

(56) References Cited

U.S. PATENT DOCUMENTS

| 5,396,539 | A | * | 3/1995 | Slekys et al. ................ 455/426 |
| H1641 | H | * | 4/1997 | Sharman ...................... 370/338 |
| 5,884,173 | A | * | 3/1999 | Sollner ........................ 455/436 |
| 5,920,817 | A | * | 7/1999 | Umeda et al. ............... 455/437 |
| 6,088,590 | A | * | 7/2000 | Anderson et al. ........... 455/437 |
| 6,138,019 | A | * | 10/2000 | Trompower et al. ........ 455/436 |
| 6,160,804 | A | * | 12/2000 | Ahmed et al. ............... 370/349 |
| 6,230,005 | B1 | * | 5/2001 | Le et al. ...................... 455/414 |
| 6,282,194 | B1 | * | 8/2001 | Cheesman et al. .......... 370/356 |
| 6,301,242 | B1 | * | 10/2001 | Lindsay et al. ............. 370/347 |
| 6,359,866 | B1 | * | 3/2002 | Svensson et al. ........... 370/331 |
| 6,385,451 | B1 | * | 5/2002 | Kalliokulju et al. ........ 455/437 |
| 6,424,638 | B1 | * | 7/2002 | Ray et al. ................... 370/331 |
| 6,438,370 | B1 | * | 8/2002 | Einola et al. ............... 455/422 |
| 6,466,556 | B1 | * | 10/2002 | Boudreaux .................. 370/331 |

FOREIGN PATENT DOCUMENTS

| WO | WO 00 19742 | 4/2000 |
| WO | WO 00 35153 | 6/2000 |
| WO | WO 00 38465 | 6/2000 |
| WO | WO 01/31963 A1 | 5/2001 |

* cited by examiner

Primary Examiner—Nay Maung
Assistant Examiner—Tan Trinh

(57) ABSTRACT

An improved wireless network provides intersystem handoffs between existing circuit wireless systems and packet systems. A packet wireless system is enhanced to provide translation between circuit and packet call models. A Media Gateway translates bearer traffic between formats used in each system. The Media Gateway, a Media Gateway Control Function, and an associated Call State Control Function, cooperate to emulate the behavior of a circuit wireless system, so that when interoperating with conventional circuit systems, the packet system appears to be another circuit wireless system. Where necessary, the Media Gateway, Media Gateway Control Function, and Call State Control Function further cooperate to emulate the functions of an anchor MSC of a circuit wireless system.

16 Claims, 9 Drawing Sheets

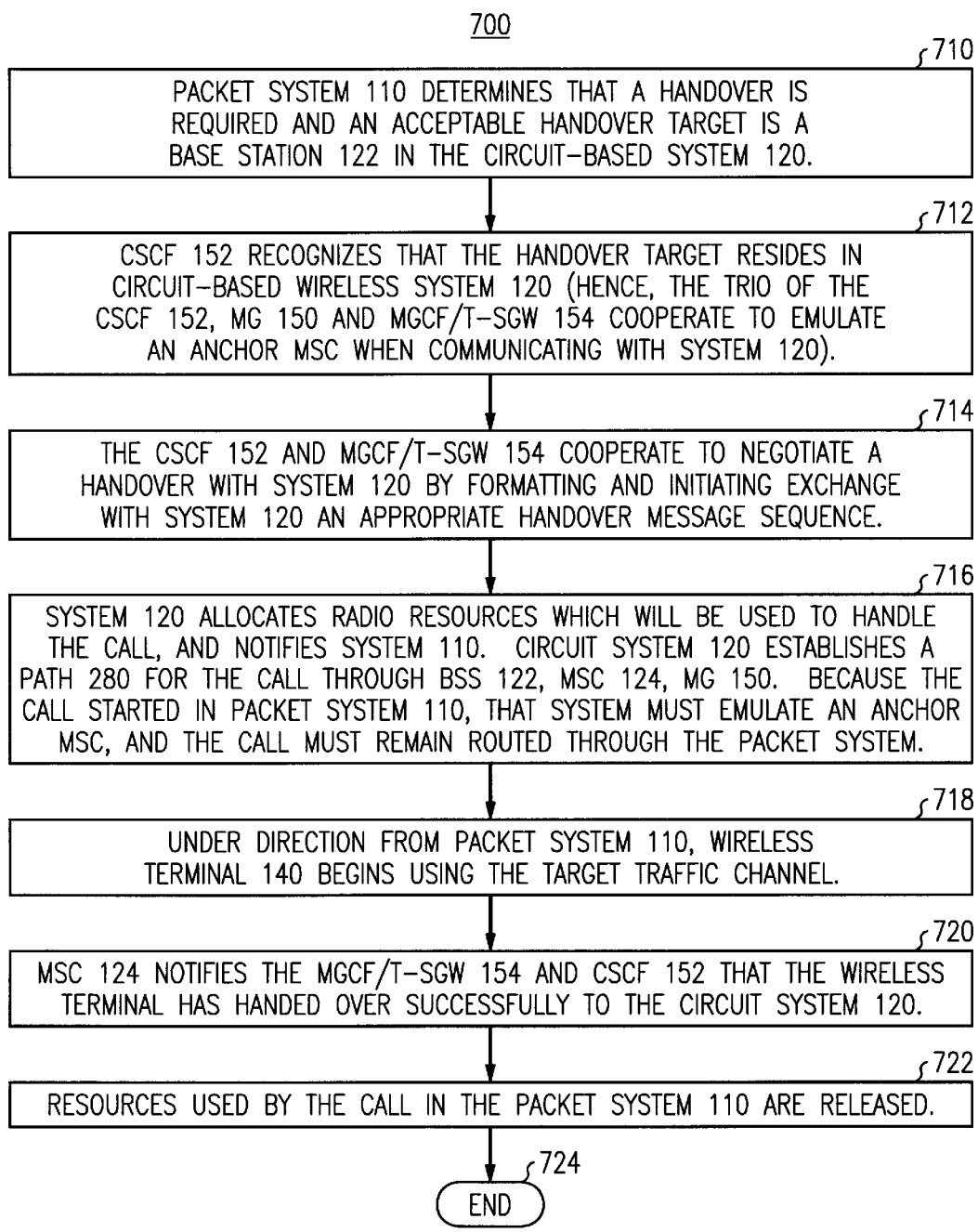

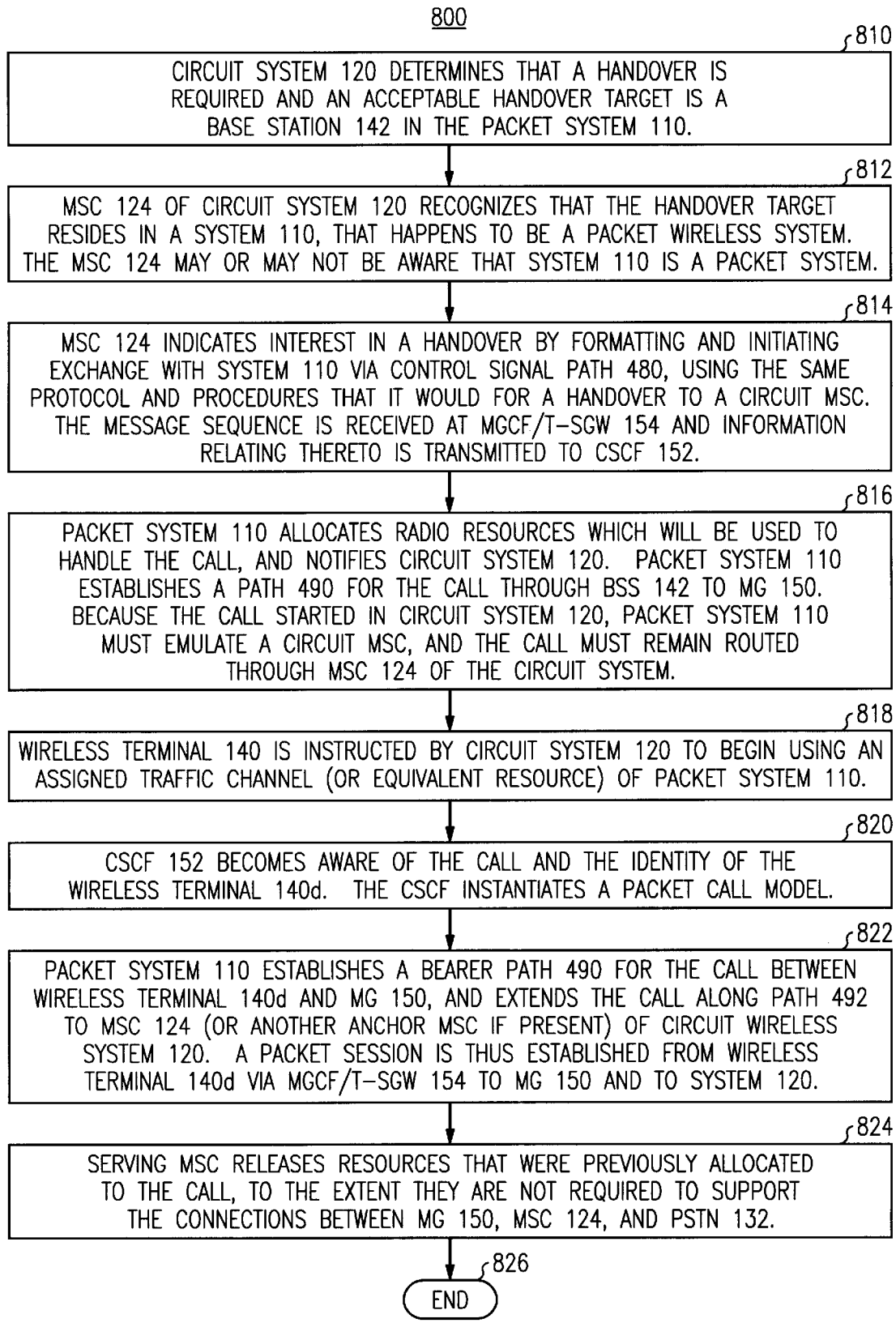

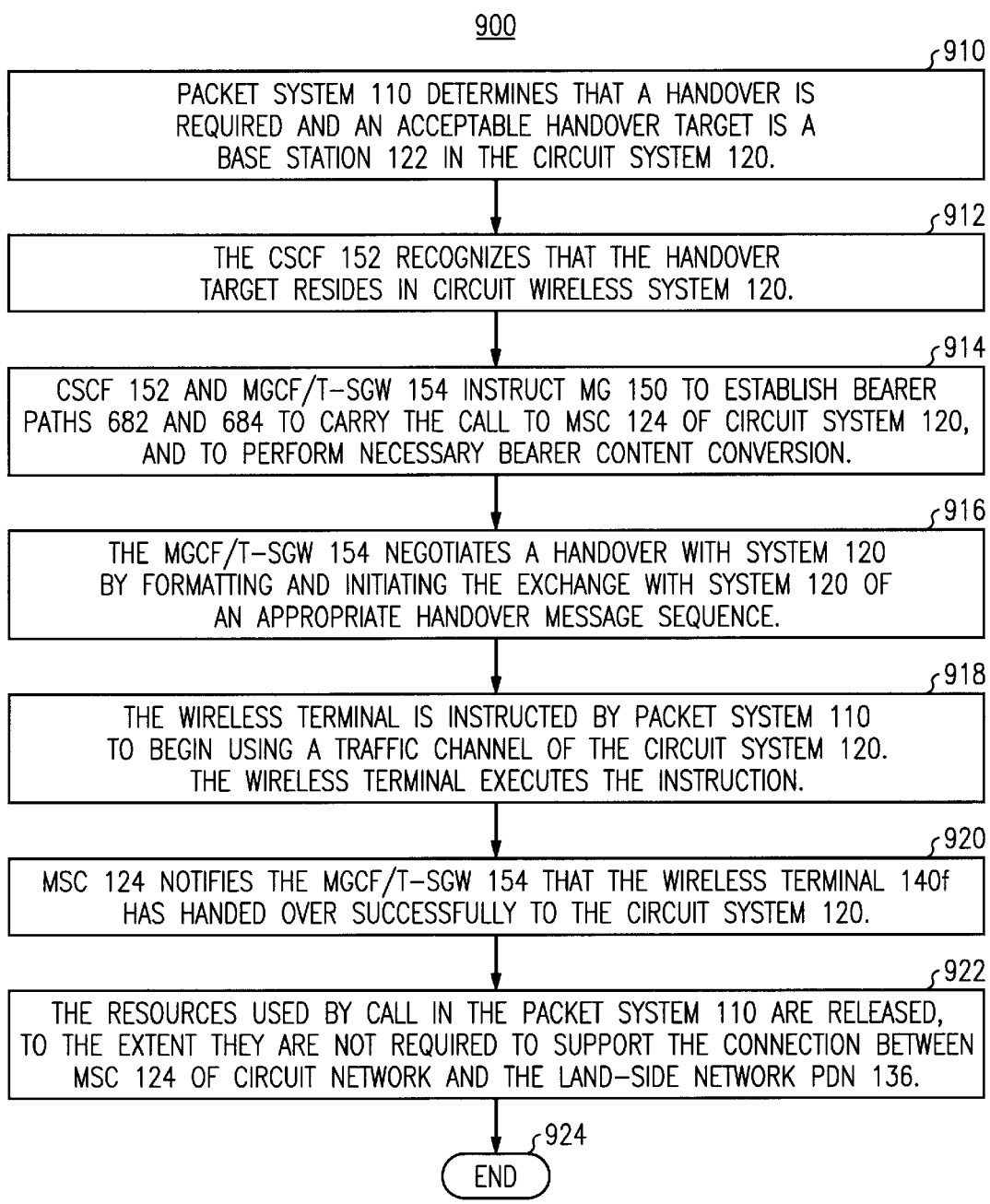

HANDOVER OF WIRELESS CALLS BETWEEN SYSTEMS SUPPORTING CIRCUIT AND PACKET CALL MODELS

FIELD OF THE INVENTION

This invention relates to telecommunications systems, and more particularly to systems and methods for supporting handover of wireless calls between wireless telecommunications systems or components thereof which support differing call models, including circuit and packet call models.

BACKGROUND OF THE INVENTION

An important feature in many wireless telecommunications systems is mobility, whereby a user involved in a call may move from a first location supported by a first set of wireless infrastructure equipment, to a second location supported by a second set of wireless infrastructure equipment, without significantly disrupting the call. Many early wireless telecommunications systems were developed to provide mobile telephone service. Early mobile telephone systems typically employed a single radio base station positioned to cover a large geographic area, albeit with limited capacity. A mobile user could travel widely within the covered area and expect to maintain a call provided that the user did not move to a location where the radio-frequency path to the base station became unusable. When cellular mobile telephone systems, comprising a large number of radio base stations each serving much smaller adjacent areas or "cells", were developed, it was essential to allow users involved in calls to move from cell to cell throughout the system's coverage area without disrupting the call.

The function and implementing processes of causing a stable call currently being served by a first radio base station (or another similar element of a wireless system providing an over-the-air interface) to be served by a second radio base station are referred to as a "handoff" or "handover". Handovers were initially provided among cells of a single system and of like technology. However, standard protocols have been developed to allow handovers among cells of different systems, and to allow handovers among cells and/or systems of differing technology. For example, standard protocols allow calls to be maintained as users cross boundaries from one wireless system to another system, perhaps operated by a different entity and using a different type or brand of infrastructure equipment. For example, protocols of this type include the standardized intersystem operations protocol known as ANSI-TIA/EIA 41-D: Cellular Radiotelecommunications Intersystem Operations, a publication of the American National Standards Institute, and the GSM 09.02 Mobile Application Part (MAP) protocol, a publication of the European Telecommunications Standards Institute (ETSI). Moreover, standard protocols have also been developed to permit handovers among systems/cells of differing (but cooperative) air interface technologies using the same call model. For example, some subscriber handsets and system infrastructure equipment may execute a handover of a call from a cell employing digital transmission technology, such as CDMA or TDMA, to a cell employing analog transmission technology, such as AMPS. The capability of performing handovers between GSM and UMTS systems has also been described. Although the need for mobility historically may have motivated the use of handovers, handovers can provide important functionality even in applications which do not require mobility by allowing load balancing and improving reliability.

Existing wireless telecommunications systems which provide handovers have employed a circuit call model. The term "call" is used herein to refer to a session of information transfer between a set of terminals via a telecommunications system or network, and is intended to include, but not be limited to traditional circuit voice calls, packet voice calls, circuit data calls, connectionless calls, or packet data calls, and multimedia variants thereof. The term "circuit" as applied to a call refers to a mode of information transfer which occurs between defined endpoints over reserved network resources, and in which units of data are not individually addressed. Once a path or route is established for a circuit call, no further routing or addressing is required. It is recognized that some components carrying a circuit call may be implemented using packet- or cell-based technologies. The term "packet" as applied to a call refers to a mode of information transfer in which a stream of information is divided into packets or units, and in which each packet or unit is individually addressed. A packet call does not necessarily reserve network resources. The term "call model" refers to the procedures, states, and state transitions required to set up, maintain, modify, and end a call. A circuit call model is a call model used to establish and control circuit calls. Examples of known circuit call models include: ITU-T Signaling System No. 7, ANSI-41, ANSI-136, ANSI-95, and GSM 04.08. A packet call model is a call model used to establish and control packet calls. Examples of known packet call models include IETF RFC-2543 (Session Initiation Protocol (SIP)) and ITU Specification H.323.

New telecommunications systems, including wireless systems, have been proposed or are being developed which employ a packet call model. Packet call models imply that during a call, certain resources and facilities may be allocated on an as-needed basis to carry the call's bearer traffic, and that the particular resources and facilities used may vary with each packet. Packet systems may support an end-to-end packet call—that is, a call where each terminal is adapted for packet communications, and the call is carried over a packet network. However, a large fraction of the world's telecommunications infrastructure employs circuit technology, and therefore, many packet systems are being designed to interwork calls with existing circuit networks, at least at certain well-defined interfaces. Thus, a call could originate at a packet terminal, but be terminated at a circuit terminal, or vice versa. Systems for interworking calls in conventional land-side packet and circuit networks are known in the art, and such a system is sold by Lucent Technologies, Murray Hill, N.J., under the designation PACKETSTAR Voice Gateway.

New packet wireless systems are likely to be constructed in phases, and it is likely that such systems will initially be deployed to overlay existing circuit wireless systems, in which system operators have made extremely large investments. Accordingly, it will be desirable to provide handovers between packet and circuit system for suitably equipped subscriber handsets and other terminals. Such handovers, advantageously, would allow subscribers to be served by the new packet system in locations where it is available, and to be served by the existing circuit system in locations where the packet system is not available or temporarily lacks capacity. In addition to providing for mobility, handovers between these systems would also allow load balancing and improve reliability.

However, existing circuit systems have employed network topology and handover processes which are uniquely suited to the circuit call model. In particular, commercially deployed circuit systems employ an anchor Mobile Switching Center, or "anchor MSC", to control a call throughout its duration. The anchor MSC is generally the first MSC to have substantive control over a call. During a call, even though the user may move into the service area of another system, which generally would be controlled by a different MSC, certain other features are controlled by the anchor MSC, and the call's bearer traffic is routed through the anchor MSC. The current serving MSC controls handoffs.

The topology of packet wireless systems, according to proposed standards, differs significantly from that of existing circuit wireless systems. In particular, in proposed packet wireless systems, the system elements providing control functions may be different from the system elements providing switching, transmission, and vocoding functions. The packet wireless systems do not employ an anchor MSC component. Furthermore, packet wireless networks employ both circuit and packet call models to interface to other networks, whereas circuit wireless networks employ only circuit call models. These significant differences, and others, make it impossible to directly apply conventional handoff processes developed for circuit wireless networks to new packet networks.

Moreover, existing circuit networks represent huge investments for their operators, but employ technology for which major upgrades may be unavailable without complete replacement or significant additional investment. Accordingly, in order to feasibly support handover with existing circuit wireless systems, any handover processes and functionality developed for packet systems must minimize required changes or upgrades to existing circuit wireless systems. Thus, handoff procedures developed for homogeneous packet networks are not sufficient for use in packet systems that must support handovers with circuit systems.

OBJECTS AND SUMMARY OF THE INVENTION

It is therefore an object of the present invention to provide systems and/or methods for performing handovers in wireless systems which avoid the aforementioned disadvantages of the prior art.

In a preferred embodiment constructed according to an aspect of the present invention, a wireless network comprises a packet wireless system and a circuit wireless system which are arranged to interoperate, including supporting handover, using a defined interoperation protocol. The circuit wireless system may be of conventional design and use any appropriate wireless technology or standards. The circuit wireless system includes at least one base station and at least one mobile switching center (or equivalent elements).

The packet wireless system may be constructed in a manner generally similar to known packet wireless networks, but with certain components added, and other components modified, to provide inter-call-model handover functions according to an aspect of the present invention. For example, the packet wireless system may employ the basic structure and functionality of a general packet radio service (GPRS) supplemented by the IP Multimedia subsystem (IM) as described by the Third-Generation Partnership Project (3GPP), with appropriate modifications. Alternative packet wireless system technologies could also be used. If a packet wireless system employing the GPRS-like architecture is used, the packet system includes an interconnected set of at least one of each of the following GPRS elements: a base station; a radio network controller; a serving GPRS support node (SGSN); and a gateway GPRS support node (GGSN). These elements generally perform as they would in a GPRS system, with some modifications to implement the interoperable handover functions of the present invention. The packet system also includes an interconnected set of at least one of each of the following elements from the 3GPP IM subsystem: a call state control function (CSCF), a media gateway (MG), and a media gateway control function/transport signaling gateway (MGCF/T-SGW), which are interconnected with the other elements. The CSCF is a network element which implements the network functions of the packet call model. The MG translates bearer content between the encoding and transmission formats used in the packet network and those used in circuit networks. For example, for voice calls, the MG may perform a vocoding function to translate between compressed formats used in packet networks and PCM formats used in circuit networks. The MG may also translate among formats used by disparate packet networks. The MGCF/T-SGW controls the MG and provides the control interface to external networks. The MGCF/T-SGW is also used to emulate certain functions of an anchor MSC when intersystem operations with a circuit wireless network are required.

According to aspects of the present invention, four possible handover situations are supported:

A stable call which is terminated on a circuit land-side network and which initially uses the packet wireless system may be handed over to the circuit wireless system. Because existing circuit systems require an anchor MSC to maintain control of a call throughout its duration, MGCF/T-SGW, MG, and CSCF cooperate to emulate the functions of an anchor MSC and appear to the circuit wireless system as simply another circuit wireless system. After the handover, bearer traffic from the circuit wireless system is routed to the circuit land-side network through the MG. As used herein, the term "land-side network" is intended to include any other network which provides interfaces equivalent to a land-side network, including but not limited to other wireless networks and transit networks.

A stable call which is terminated on a circuit land-side network and which initially uses the circuit wireless system may be handed over to the packet wireless system. Because existing circuit systems require an anchor MSC to maintain control of a call throughout its duration, the MSC of the circuit system maintains control of the call. MGCF/T-SGW, MG, and CSCF cooperate to emulate the functions of a circuit MSC for intersystem handovers and appear to the circuit wireless system as simply another circuit wireless system. After handover, bearer traffic exchanged between the packet wireless network and the circuit land side network is routed through the MG to the circuit wireless system.

A stable call which is terminated on a packet land-side network and which initially uses the packet wireless system may be handed over to the circuit wireless system. Because existing circuit systems require an anchor MSC to maintain control of a call throughout its duration, MGCF/T-SGW, MG, and CSCF cooperate to emulate the functions of an anchor MSC and appear to the circuit wireless system as simply another circuit wireless system. Prior to handover, the MG may or may not be an element of the bearer path. After the handover, bearer traffic from the circuit wireless system is routed to the packet land-side network through the MG and GGSN.

A stable call which is terminated on a packet land-side network and which initially uses the circuit wireless system may be handed over to the packet wireless system. Such a call must transit through an interworking function, which masks the existence of the packet network to the circuit network. Therefore, this case reduces to the instance of a call which is terminated on a circuit land-side network and which initially uses the circuit wireless system and is handed over to the packet wireless system.

These four handover situations describe all possible handover combinations between packet and circuit networks. The system and methods disclosed herein advantageously allow intersystem handoffs between packet wireless systems and conventional wireless circuit systems. The handoff functionality is provided in the packet system, minimizing or avoiding entirely the need to modify or upgrade existing circuit systems.

BRIEF DESCRIPTION OF THE DRAWINGS

These and other features of the invention will be best understood by reference to the following detailed description of a preferred embodiment of the invention, taken in conjunction with the accompanying drawings, in which:

FIG. 7 is a flow diagram showing a method according to an aspect of the present invention for use in conjunction with the cooperative wireless network 100 of FIG. 1 for performing, for a call between a wireless terminal and a land-side circuit terminal, a handover from the packet system to the circuit system;

FIG. 8 is a flow diagram showing a method according to an aspect of the present invention for use in conjunction with the cooperative wireless network 100 of FIG. 1 for performing, for a call between a wireless terminal and a land-side circuit terminal, a handover from the circuit system to the packet system; and FIG. 9 is a flow diagram showing a method according to an aspect of the present invention for use in conjunction with the cooperative wireless network 100 of FIG. 1 for performing, for a call between a wireless terminal and a land-side packet terminal, a handover from the packet system to the circuit system.

DETAILED DESCRIPTION OF THE PREFERRED EMBODIMENTS

FIGS. 1–6 are block diagrams showing a preferred embodiment of a cooperative wireless network 100 constructed according to an aspect of the present invention.

The present application relates to telecommunications systems. It will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIGS. 1–6, connections between elements are referred to as links or paths and may be shown in solid or broken lines. Such lines may or may not have reference numbers applied thereto, and such lines may further have characterizing indicia, such as single hash marks, double hash marks, dots, or "X"s applied thereto. Connecting lines which lack a reference number or other indicia represent a link which is available to carry control or bearer traffic, which link may or may not be used in the particular situation depicted in the figure. Solid lines with no additional characterizing indicia represent links for carrying bearer information. Broken lines with no additional characterizing indicia represent links for carrying control information. Connecting lines which bear a reference number or the aforementioned characterizing indicia (hereafter, "paths") are provided as an overlay to identify which of the available links are actually used in the particular situation depicted in the figure. Thus, the paths do not indicate additional links, but rather indicate whether and how an available link is used.

In addition to showing the structural organization of network 100, FIGS. 1–6 further depict initial and final configurations of control and bearer paths prior to, and at the conclusion of, several different handover situations supported in a preferred embodiment of a telecommunications system constructed according to the present invention. Paths having single hash marks indicate the initial configuration of bearer paths prior to the handover. Paths having double hash marks indicate the final configuration of bearer paths at the conclusion of the handover. Paths having dots indicate the initial configuration of control paths prior to the handover. Paths having "X"s indicate the final configuration of control paths at the conclusion of the handover.

Figure 1:
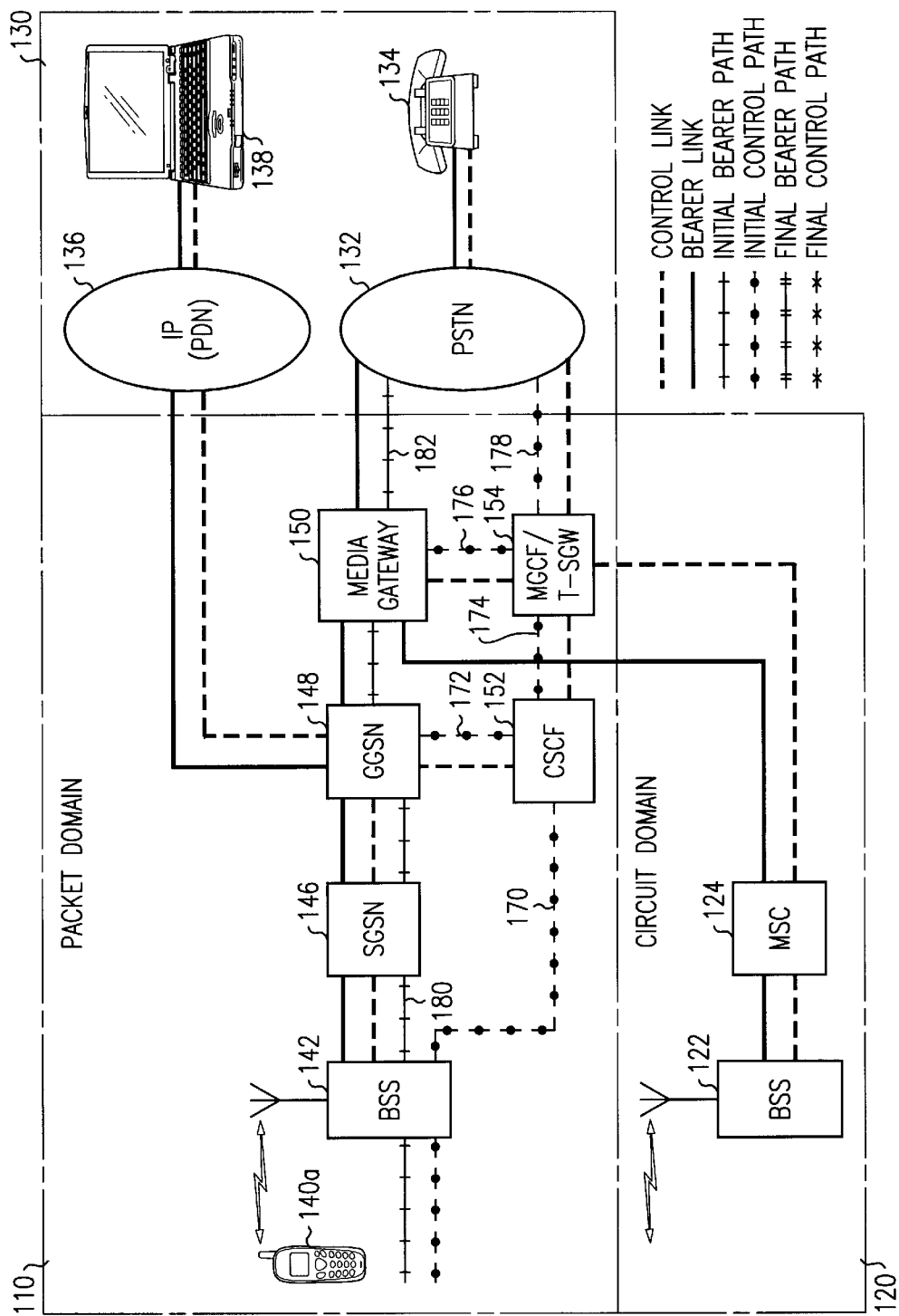
FIG. 1 is a block diagram showing a cooperative wireless network 100 constructed according to an aspect of the present invention, including a packet wireless system and circuit wireless system arranged for intersystem operation, and further depicting, for a call between a wireless terminal and a land-side circuit terminal, the initial configuration of control and bearer signal paths prior to a handover from the packet system to the circuit system.
Figure 3:
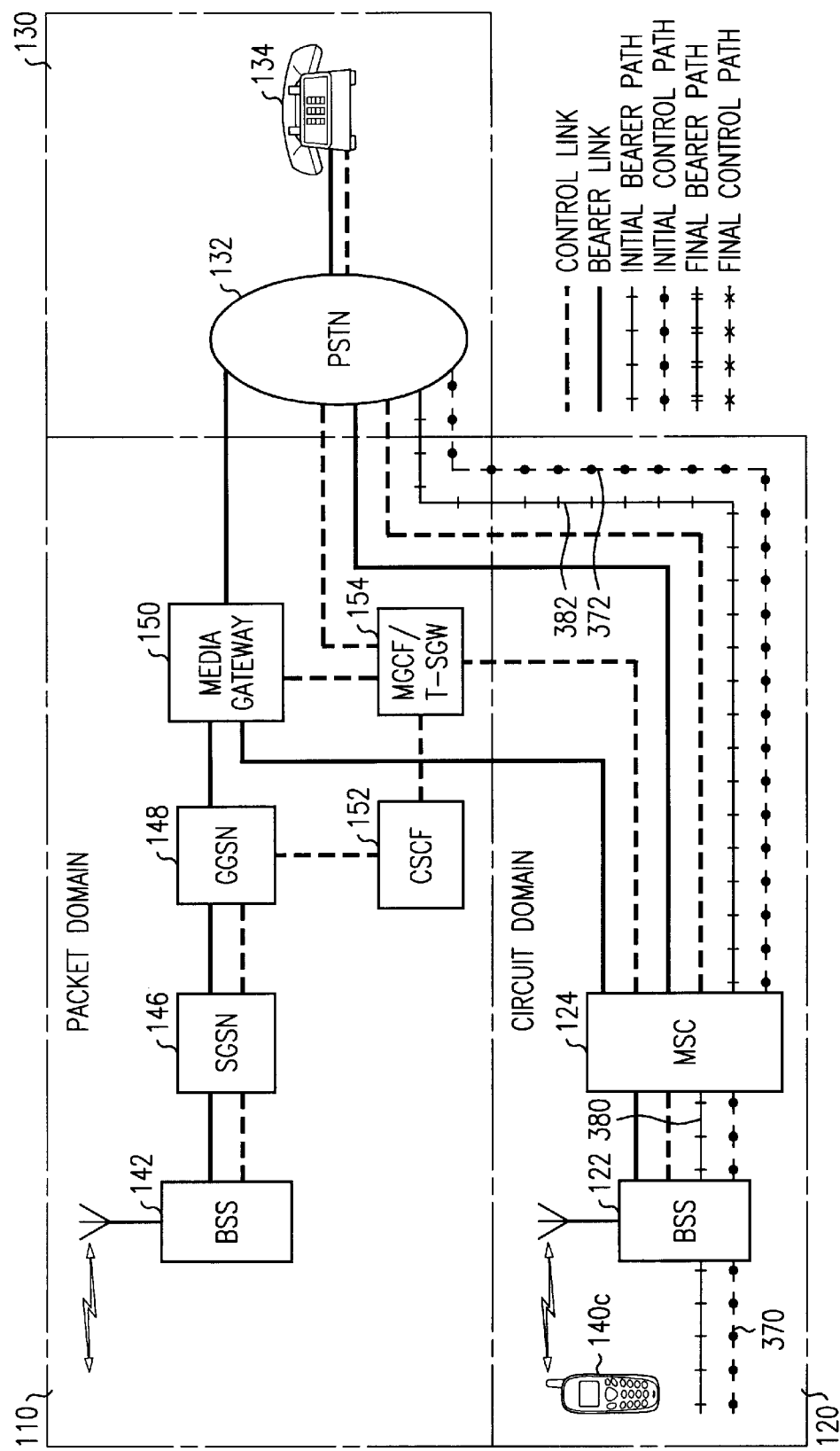
FIG. 3 is a block diagram of the cooperative wireless network 100 of FIG. 1 depicting, for a call between a wireless terminal and a land-side circuit terminal, the initial configuration of control and bearer signal paths prior to a handover from the circuit system to the packet system.
Figure 4:
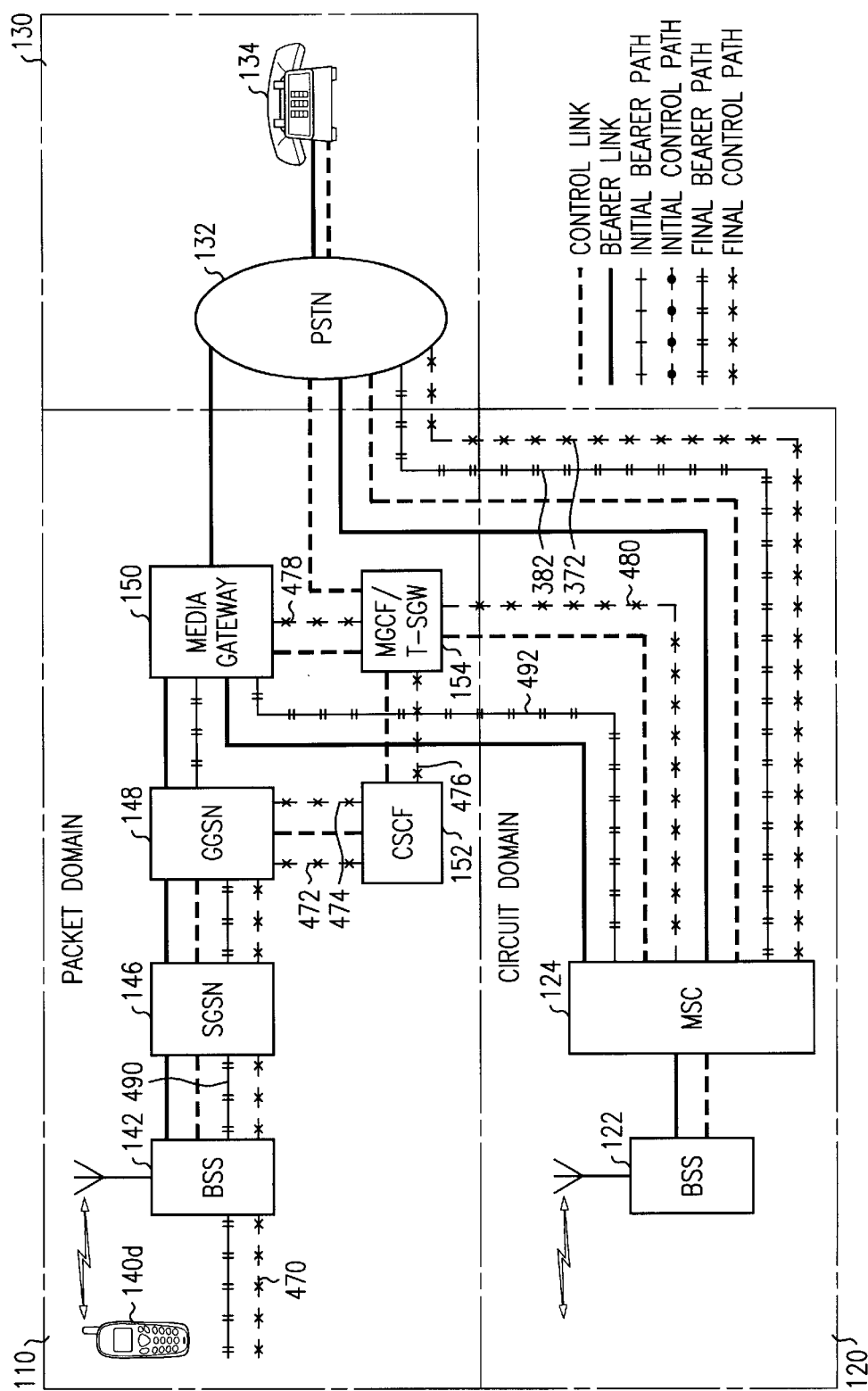
FIG. 4 is a block diagram of the cooperative wireless network 100 of FIG. 1 depicting, for the call of FIG. 3, the final configuration of control and bearer signal paths at the conclusion of a handover from the circuit system to the packet based system.

As best seen in FIG. 1, network 100 preferably comprises a packet wireless telecommunications system 110 and a circuit wireless telecommunications system 120 which are arranged for intersystem operation with each other, and are also arranged for interworking with suitable land-side networks. As used herein, the term "land-side network" is intended to include any other network which provides interfaces equivalent to a land-side network, including but not limited to other wireless networks and transit networks. For example, packet wireless system 110 is shown in FIG. 1 as connected to a Public Switched Telephone Network (PSTN) 132, which may be generally characterized as a circuit network, and to a Packet Data Network 136, which may be generally characterized as a packet network. As best seen in FIGS. 3–4, circuit wireless system 120 may also be connected to external network 132. Although the networks 132 and 136 may, in fact, employ transmission and switching elements of various circuit and/or packet technologies, the networks are characterized herein according to the interface they present to other networks and systems and in particular, to the call model each network employs.

The term "call" is used herein to refer to a session of information transfer between a set of terminals via a telecommunications system or network, and is intended to include, but not be limited to traditional circuit voice calls, packet voice calls, circuit data calls, connectionless calls, or packet data calls, and multimedia variants thereof. This application will refer to calls involving two terminals, but one of skill in the art will appreciate how to modify the exemplary embodiment to support multi-party calls in keeping with the spirit of the present invention.

As is known in the art, network 110 may interface to the packet land-side network 136 (hereafter, "PDN") using appropriate packet protocols, including those specified in IETF RFC-2543 (Session Initiation Protocol (SIP)) and ITU Specification H.323. Other protocols and standards could also be used. Network 110 may interface to the circuit land-side network 132 using circuit protocols generally known in the art as ITU-T Signaling System No. 7. As discussed further, packet wireless network 110 preferably includes suitable gateway facilities 150 and 154 to convert bearer and control information between the formats and call models required in the packet wireless network and those required in the circuit land-side network 132 (hereafter, "PSTN").

Although an exemplary embodiment of network 100 is shown as comprising a single packet wireless system 110 and a single circuit wireless system 120, one skilled in the art will appreciate that commercially deployed embodiments may incorporate multiple wireless systems of each type. Similarly, although the exemplary embodiment of network 100 is shown as connected to two land-side networks, PSTN 132 and PDN 136, are shown, it will be appreciated that commercially deployed embodiments may be connected to several such networks. Most commercial wireless systems incorporate a plurality of connection points for interfacing to other wireless systems and to external, public, or land-side networks.

Circuit wireless system 120 is preferably any appropriate wireless telecommunications system. For example, system 120 may be any of the wireless system types commonly known as AMPS, GSM, TDMA, or CDMA (but is not limited to these types), the behavior of which system types are defined by well-known industrial, governmental, or intergovernmental standards bodies. Further, system 120 preferably provides a suitable defined interface for interoperating with other wireless systems. For example, system 120 may implement the standardized intersystem operations protocol known as ANSI-TIA/EIA 41-D: Cellular Radiotelecommunications Intersystem Operations, a publication of the American National Standards Institute, the GSM 09.02 Mobile Application Part (MAP) protocol, a publication of the European Telecommunications Standards Institute (ETSI), or another suitable protocol.

As best seen in FIGS. 1–6, circuit system 120 preferably comprises at least one base station system (BSS) 122 having a control and bearer connection to at least one mobile switching center (MSC) 124. As best seen in FIGS. 3–4 (but not shown in the other figures to improve clarity), MSC 124 has control and bearer connections to land-side networks PSTN 132. MSC 124 could also have control and bearer connections (not shown) to PDN 136 via an interworking gateway. When a call terminates in PDN 136 via the interworking gateway, the interworking gateway masks the packet nature of PDN 136, and circuit system 120 therefore treats the call in a manner similar to a call terminating on PSTN 132. MSC 124 preferably has a control and bearer connection to a media gateway element 150 of packet network 110 (discussed further in detail). For simplicity, only a single BSS and a single MSC are shown. However, in a commercial embodiment, system 120 would likely incorporate many BSSs connected to the MSC, and may incorporate several MSCs. System 120 may contain other elements which are not essential to an understanding of the present invention and are omitted to enhance clarity.

Packet wireless system 110 may be constructed in a manner generally similar to known packet wireless networks, but with certain components added, and other components modified, to provide interoperable handover functions according to an aspect of the present invention, as further described herein. For example, system 110 may employ the basic structure and functionality of General Packet Radio Service (GPRS), with appropriate modifications as further described. GPRS is a packet wireless telecommunications system described in an extensive series of standards documents, including European Telecommunications Standards Institute GSM specifications 02.60, 03.60, and 04.60, and the Third Generation Partnership Project (3GPP) Technical Specification 3GPP TS 23.060. Although the following description of packet wireless system 110 uses the terminology of GPRS, other packet wireless systems could also be used, including but not limited to the CDMA Packet system as defined in ANSI specification IS-835, which is, in part, an implementation of the Mobile IP system as defined in RFCs 2002, 2003, 2004, 2005, 2006, and 2344 (publications of the Internet Engineering Task Force (IETF)).

As best seen in FIGS. 1–6, system 110 preferably comprises a base station system (BSS) 142, a serving GPRS support node (SGSN) 146, a gateway GPRS support node (GGSN) 148, a media gateway (MG) 150, a call state control function (CSCF) 152, and a media gateway control function (MGCF/T-SGW) 154. BSS 142 is adapted for wireless communications with a suitable wireless user terminal 140a–140f (140 when referred to in a general context unrelated to a particular one of the handover situations of FIGS. 1–6). BSS 142 has a control and bearer connection to SGSN 146. SGSN 146 has a control and bearer connection to GGSN 148. GGSN has a control and bearer connection to MG 150. GGSN 148 also has a control and bearer connection to land-side network PDN 136, and may have such connections to other networks (not shown). MG has a bearer connection to land-side network PSTN 132, and may have such connections to other networks (not shown). GGSN 148 also has a control connection to CSCF 152. MG 150 further has a control connection to MGCF/T-SGW 154. CSCF 152 further has a control connection to MGCF/T-SGW 152. MGCF/T-SGW 152 has a control connection to PSTN 132.

In general, BSS 142, SGSN 146, and GGSN 148 perform the functions equivalent to those they would normally perform in a GPRS system. However, packet wireless system 110 must interoperate with circuit land-side networks such as PSTN 132, and also with circuit wireless systems such as system 120. Because call models, the format of control information, and the format of bearer content used in circuit systems differ from those used in packet systems, the packet network 110 cannot communicate directly with circuit networks using the packet networks native bearer content or control message formats. Accordingly, MG 150 performs the function of converting bearer content between the form used in packet network 110 and the forms used in PSTN 132 and circuit network 120. MGCF/TSGW 154 controls the MG 150. MGCF/T-SGW 154 and CSCF 152 cooperate to translate the call models and the control information associated with the processing of calls between the form used in packet network 110 and the forms used in PSTN 132 and circuit wireless network 120.

In addition, MGCF/T-SGW 154 and CSCF 152 further cooperate to emulate the handover functions and anchor Mobile Switching Center (anchor MSC) feature control functions of the mobile switching center (MSC) of a circuit wireless network, thereby allowing packet network 110 to interoperate with circuit network 120 as though the packet network were simply another circuit network. The functionality required of the emulated anchor MSC in the packet system 110 are less than the complete functionality required of an MSC in a circuit system 120. In particular, the emulated anchor MSC must manage intersystem handovers, but is not required to manage radio resources because in packet system 110 radio resources are managed by the BSS 142 rather than a central MSC. The functionality of the emulated anchor MSC primarily resides in the CSCF 152 and the MGCF/T-SGW 154, and preferably includes the ability to send hand-off requests or return hand-off-related information to the MSC 124 of the circuit system 120.

The various functions required to support inter-system handovers may be allocated as appropriate for the particular architecture used to implement the. packet system 110. In a preferred embodiment of a packet system 110 constructed according to the present invention, the allocation may be as follows. The MG 150 performs all necessary conversions of bearer information for any call involving both wireless packet system 110 and either circuit system 120 or circuit land-side network PSTN 132. The MGCF/T-SGW 154 performs signaling protocol translation between the packet system 110 and either circuit system 120 or circuit-land-side network PSTN. The MGCF/T-SGW 154 also controls the MG 150 via appropriate control messages, including instructing the MG regarding when to perform conversion among bearer formats, which conversions to perform, and identifying particular facilities to be used. The CSCF 152 implements the call model that the circuit MSC expects to perceive during a handover.

Advantageously, circuit system 120 requires minimal or no modifications or upgrades to interoperate with packet network 110 in this way. It may be advantageous for circuit system 120 to identify which user terminals 140 are packet-capable, and only attempt handovers to packet system 110 of such terminals. Most conventional circuit systems 120 include capabilities for distinguishing among user terminals having capabilities of interworking calls with certain other systems. For example, some user terminals transmit a "class mark" identifying systems with which they may operate. Some wireless systems are arranged to negotiate with a user's home system certain profile information, which similarly may identify the systems with which the user terminal 140 may operate. Accordingly, identifying packet-capable user terminals 140 to circuit system 120 may involve defining a currently-reserved value of a parameter used by the system 120 to implement its current capability of inter-working calls with other circuit systems. Nonetheless, a change to standards relating to circuit systems and their interpretation of the class mark or profile information may be advantageous. Alternatively, if "mobile-assisted handover" is used to determine which cells may be handover targets, the user terminal preferably will report only cells with which it is compatible. This may obviate changes to the circuit system or related standards.

As noted above, packet wireless system 110 could also be implemented using the technology of the CDMA Packet system as defined in ANSI specification IS-835. In that case, the functions of the BSS 140 would be performed by the Base Transceiver System (BTS) of the CDMA packet system, and the functions of the SGSN 146 and GGSN 148 would be performed by the Home Agent and Packet Data Serving Node (PDSN) of the CDMA packet system.

FIGS. 1–6 depict initial and final configurations of control and bearer paths for four different handover situations in network 100. FIGS. 7–9 are flow diagrams showing the steps of methods, for use in conjunction with the network 100 of FIGS. 1–6 and in conjunction with aspects of the present invention, for performing the handovers. Each handover situation will be discussed in conjunction with the figures showing the initial and final signal path configurations and the corresponding handover method.

Figure 2:
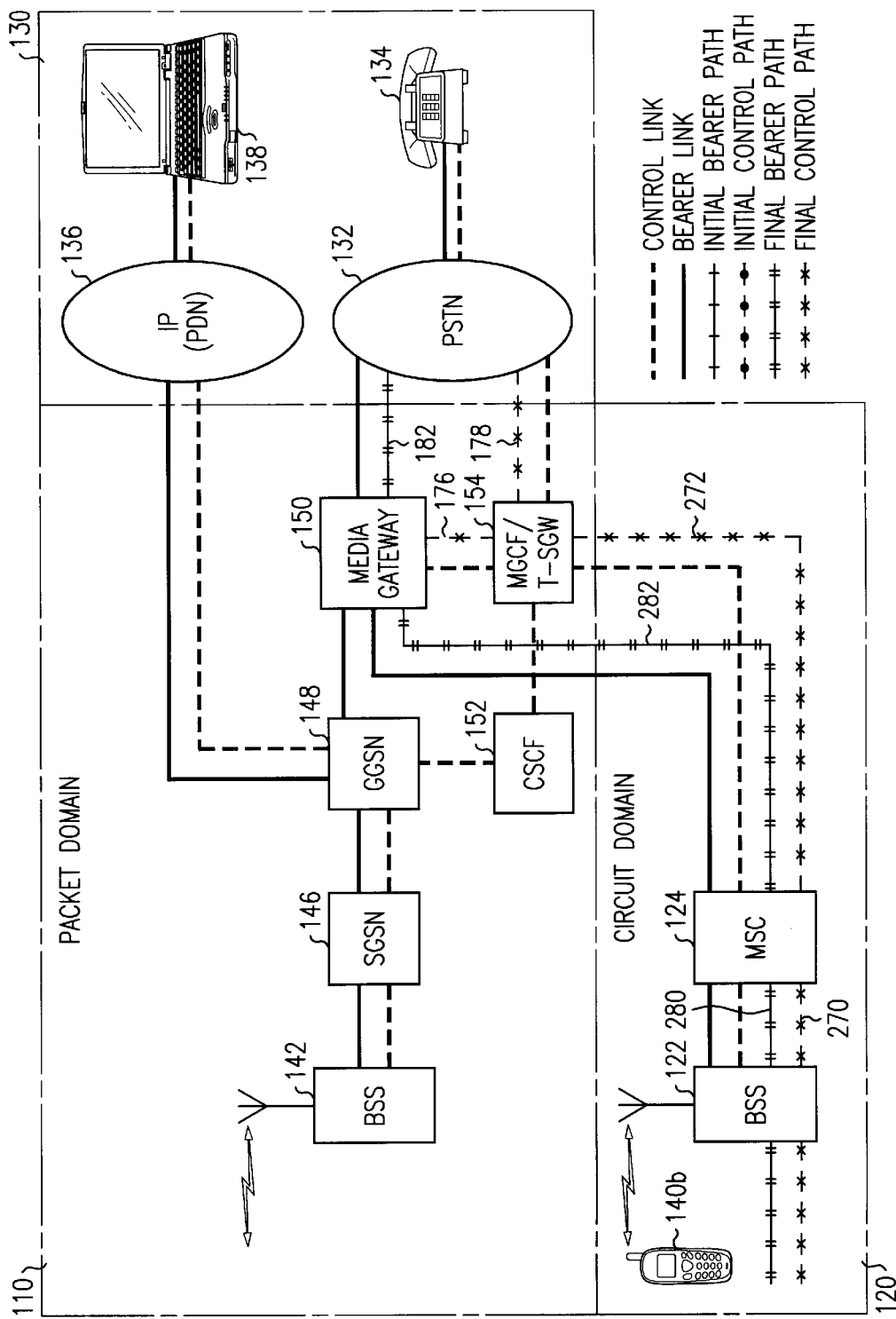
FIG. 2 is a block diagram of the cooperative wireless network 100 of FIG. 1 depicting, for the call of FIG. 1, the final configuration of control and bearer signal paths at the conclusion of a handover from the packet system to the circuit system.

FIGS. 1–2 and 7 are directed to a handover of a call from the packet system 110 to the circuit system 120, where the land-side termination is through a circuit network such as PSTN 132. Thus, this handover situation contemplates that a stable call has been established between wireless subscriber terminal 140a and land-side subscriber terminal 134, through packet wireless system 110 and circuit land-side network PSTN 132. In this situation, and all others discussed hereafter, it does not matter whether the call originated at the wireless terminal 140 or the land-side terminals 134, 138. Moreover, for all handover situations discussed herein, although terminals may be depicted in the figures as equipped for particular media or content (e.g., terminal 140a is depicted as a voice handset, and terminal 134 is depicted as an ordinary voice telephone), any of these terminals could be equipped for any media or content types supported by the wireless system and land-side networks, including but not limited to voice, video, facsimile, and the like.

Although the present invention is not directed to the initial set-up of a call, the following steps may be helpful as background information in understanding the process of establishing an exemplary call from the wireless terminal 140a to the land-side terminal 134:

(a) terminal 140a registers with packet system 110 and "discovers" (or becomes aware of) CSCF 152;

(b) terminal 140a transmits a message to CSCF 152, using Session Initiation Protocol, H.323, or another suitable packet call-setup protocol, requesting a call to land-side terminal 134, which happens to reside on the circuit network PSTN 132;

(c) the CSCF 152 transmits a control message to the GGSN 148 indicating that the packet session is destined for MG 150 because the called endpoint resides on the circuit network PSTN 132;

(d) the MGCF/T-SGW 154 transmits control messages to the MG 150 instructing it that it will be receiving the terminating end of the packet call, specifying that the bearer content must be converted to/from 64 kbps PCM, and that the PCM stream is to be transmitted to/from the circuit network PSTN 132 on a trunk;

(e) the MGCF/T-SGW 154 translates packet call model functions to signaling appropriate for the circuit network PSTN 132 (e.g., ITU-T No. 7 signaling messages) and transmits the signaling to PSTN 132; and (f) the MG 150 bidirectionally converts bearer traffic between the packet system 110 and the circuit land-side network PSTN 132.

The above-described process results in a stable call between terminal 140*a* and terminal 134, and is depicted in FIG. 1. As best seen in FIG. 1, a control path 170 is present between terminal 140*a* and CSCF 152. An additional control path 172 extends between CSCF 152 and GGSN 148, and a further control path 174 extends between CSCF 152 and MGCF/T-SGW 154. A control path 176 extends between MGCF/T-SGW 154 and MG 150. All of the aforementioned control paths are packet. In addition, a circuit control path 178 extends between MGCF/T-SGW 154 and PSTN 132, allowing MGCF/T-SGW 154 to exchange call set-up and other signaling with the circuit network. A packet bearer path 180 extends between terminal 140*a* and MG 150. A circuit bearer path 182 extends between MG 150 and PSTN 132. The MG 150 acts as a vocoder, translating bearer traffic between the packet wireless system and the circuit land-side network PSTN 132.

FIG. 7 is a flow diagram showing a method 700 according to an aspect of the present invention for use in conjunction with the cooperative wireless network 100 of FIG. 1 for performing, for a call between a wireless terminal 140 and a land-side circuit terminal 134, a handover from the packet system 110 to the circuit system 120. The method begins at step 710, in which system 110 determines that a handover is required and an acceptable handover target is a base station 122 in the circuit system 120. This determination may be performed, for example, by the BSS 142 of packet system 110 and reported to CSCF 152. A variety of techniques for determining when handovers are required, and which of several potential handover targets are optimal, are well known in the art. Different wireless system technologies have adopted different approaches to this problem. Handovers may be desirable, for example, because the current RF path between the terminal and the base station is of poor quality, or to achieve load balancing or optimization among neighbor cells, or for other administrative or policy reasons. Methods for selecting a suitable handover target include the polling of nearby base stations for a measurement of the signal strength of the wireless terminal, and so-called "mobile-assisted handover" in which the wireless terminal reports measurements of the signal strength of transmissions from nearby base stations. With respect to the present invention, any handover determination technique appropriate for the wireless system technologies of systems 110 and 120 may be used.

In step 712, the CSCF 152 recognizes that the handover target resides in circuit wireless system 120 and therefore the CSCF 152, MG 150, and MGCF/T-SGW 154 must cooperate to emulate an anchor MSC when communicating with system 120. In step 714, CSCF 152 and MGCF/T-SGW 154 cooperate to negotiate a handover with system 120 by formatting and initiating exchange with MSC 124 an appropriate handover message sequence. If system 120 uses the ANSI-41 intersystem operations protocol, the appropriate message sequence is: (a) Facilities Directive Invoke from the MGCF/T-SGW 154 to MSC 124 of the circuit system 120 requesting a traffic channel at the target cell; (b) Facilities Directive Conversation from the MSC 124 to the MGCF/T-SGW 154 confirming the reservation of the radio resource and identifying such resource (e.g., the identity of the granted traffic channel); and (c) Mobile on Channel Indication from the MSC 124 to the MGCF/T-SGW 154 notifying that the wireless terminal has handed over successfully. In step 716, system 120 allocates radio resources which will be used to handle the call, and notifies system 110 of the identity of such resources. Circuit system 120 establishes a path 280 for the call through BSS 122, MSC 124, MG 150. Because the call started in packet system 110, that system must emulate an anchor MSC, and the call must remain routed through the packet system. Accordingly, the call is extended between MSC 124 and MG 150 via bearer path 282.

In step 718, under direction from packet system 110, the wireless terminal begins using the assigned target traffic channel. In step 720, the MSC 124 notifies the MGCF/T-SGW 154 and CSCF 152 that the wireless terminal 140*b* (see FIG. 2) has handed over successfully to the circuit system 120. In step 722, the resources used by call in the packet system 110 are released. The bearer path 182 between MG 150 and PSTN 132 remains in use. In some implementations, the vocoding required by wireless systems may be performed in the MSC 124, and in others, that vocoding may be performed in MG 150. Vocoding in the MG 150 may be preferable in that it conserves network resources. In addition to serving vocoder/format conversion needs, MG 150 may also incorporate a switching fabric and other facilities to provide certain features normally provided by a circuit MSC. However, the MG 150 may implement the fabric and provide the features using technology other than conventional circuit technology. The method ends in step 724.

FIG. 2 is a block diagram showing the final configuration of control and bearer paths at the successful completion of a handover from the packet system 110 to the circuit system 120. A bearer path 280 extends from wireless terminal 140*b* through BSS 122 and MSC 124. The bearer path 282 further extends from MSC 124 to MG 150 of packet system 110. The bearer path 182 between MG 150 and PSTN 132, previously used to carry the call when it was carried within the packet network, remains in use. A control path 270 extends from wireless terminal 140*b* to MSC 124. A control path 272 extends from MSC 124 to MGCF/T-SGW 154 of packet wireless system 110. The control path 176, which extended from MGCF/T-SGW 154 to MG 150 remains in place, as does control signaling path 172 which extends from the MGCF/T-SGW 154 to the CSCF 152. The circuit signaling control path from MGCF/T-SGW 154 to PSTN 132 also remains in place. Thus, CSCF 152, MGCF/T-SGW 154 and MG 150 cooperate to perform the functions of an anchor MSC for the call which is now largely handled by the circuit system 120.

FIGS. 3–4 and 8 are directed to a handover of a call from the circuit system 120 to the packet system 110, where the land-side termination is through a circuit network such as PSTN 132. Thus, this handover situation contemplates that a stable call has been established between wireless subscriber terminal 140*c* and land-side subscriber terminal 134, through circuit wireless system 120 and circuit land-side network PSTN 132.

In order for a handover to occur, a stable call must be established between the wireless terminal 140*c* to the land-side terminal 134, the configuration of which is best seen in FIG. 3. A control path 370 is present between terminal 140*c* and MSC 124. An additional control path 372 extends between MSC 124 and PSTN 132. All of the aforementioned control paths are circuit. A circuit bearer path 380 extends between terminal 140*c* and MSC 124. A circuit bearer path 382 extends between MSC 124 and PSTN 132.

FIG. 8 is a flow diagram showing a method 800 according to an aspect of the present invention for use in conjunction with the cooperative wireless network 100 of FIG. 3 for performing, for a call between a wireless terminal 140 and a land-side circuit terminal 134, a handover from the circuit system 120 to the packet system 110. The method begins at step 810, in which circuit system 120 determines that a handover is required and an acceptable handover target is a base station 142 in system 110. See also the discussion of handover determination associated with step 710. In step 812, the MSC 124 determines that the handover target resides in system 110. Circuit system 120 is not necessarily aware that system 110 is a packet system.

In step 814, circuit system 120 indicates interest in a handover by formatting and initiating a message sequence exchanged via control path 480 (FIG. 4) with MGCF/T-SGW 154. The message sequence may be exchanged with the serving MSC 124 or by an anchor MSC (not shown) if one is present in the call. The MSC may employ the same protocol and procedures that it would for a handover to a circuit MSC. If system 120 uses the ANSI-41 intersystem operations protocol, the handover negotiation may employ, in the opposite direction (i.e., circuit system to packet system), the message sequence described in connection with step 714. The message sequence is received at MGCF/T-SGW 154 and information relating thereto is transmitted to CSCF 152. In step 816, packet system 110 allocates radio resources which will be used to handle the call, and notifies circuit system 120. Packet system 110 establishes a path 490 for the call through BSS 142 to MG 150. Because the call started in circuit system 120, packet system 110 must emulate a circuit MSC, and the call must remain routed through MSC 124 of the circuit system. In step 818, the wireless terminal 140 is instructed by circuit system 120 to begin using an assigned traffic channel (or equivalent resource) of packet system 110.

In step 820, the CSCF 152 becomes aware of the call and the identity of the wireless terminal 140d. The CSCF instantiates a packet call model. In step 822, packet system establishes a bearer path 490 for the call to the MG 150. As a result of this step, a packet session is established from wireless terminal 140d to MG 150. The call is extended along a bearer path 492 to MSC 124 (or another anchor MSC if present) of circuit wireless system 120. The land-side-network facing leg of the call remains in the circuit system 120 because of the requirement that the anchor MSC maintain control of the call.

Following the handover, the provision of features requested by the user (to the extent they may be available in the circuit system 120) continue to be managed by MSC 124 of circuit system 120 (or another anchor MSC if present). In step 824, the serving MSC releases resources that were previously allocated to the call, to the extent they are not required to support the connections between MG 150, MSC 124, and PSTN 132. The method ends at step 826.

FIG. 4 is a block diagram showing the final configuration of control and bearer paths at the successful completion a handover from the circuit system 120 to the packet system 110. A bearer path 490 extends from wireless terminal 140d through BSS 142 to MG 150. A bearer path 492 further extends from MG 150 to MSC 124, thereby allowing packet system 110 to route the call to the anchor MSC of the circuit system 120. The bearer path 382 between MSC 124 and PSTN 132, previously used to carry the call when it was carried within the circuit network, remains in use.

A control path 470 extends from wireless terminal 140d to GGSN 148 and MG 150. Additional control paths 472, 474 extend from GGSN 148 to CSCF 152. A control path 478 extends from MG 150 to MGCF/T-SGW 154. A control path 476 links CSCF and MGCF/T-SGW. All of the aforementioned control paths are packet paths. A circuit control path 480, which may, for example, be implemented as a ITU-T Signaling System No. 7 link, extends between MGCF/T-SGW 154 to MSC 124 of circuit wireless system 120. The circuit control path 372, which extended from MSC 124 to PSTN 132 remains in place. Thus, MSC 124 (or another anchor MSC if present) functions as an anchor MSC for a call largely handled by the packet network 110.

Figure 5:
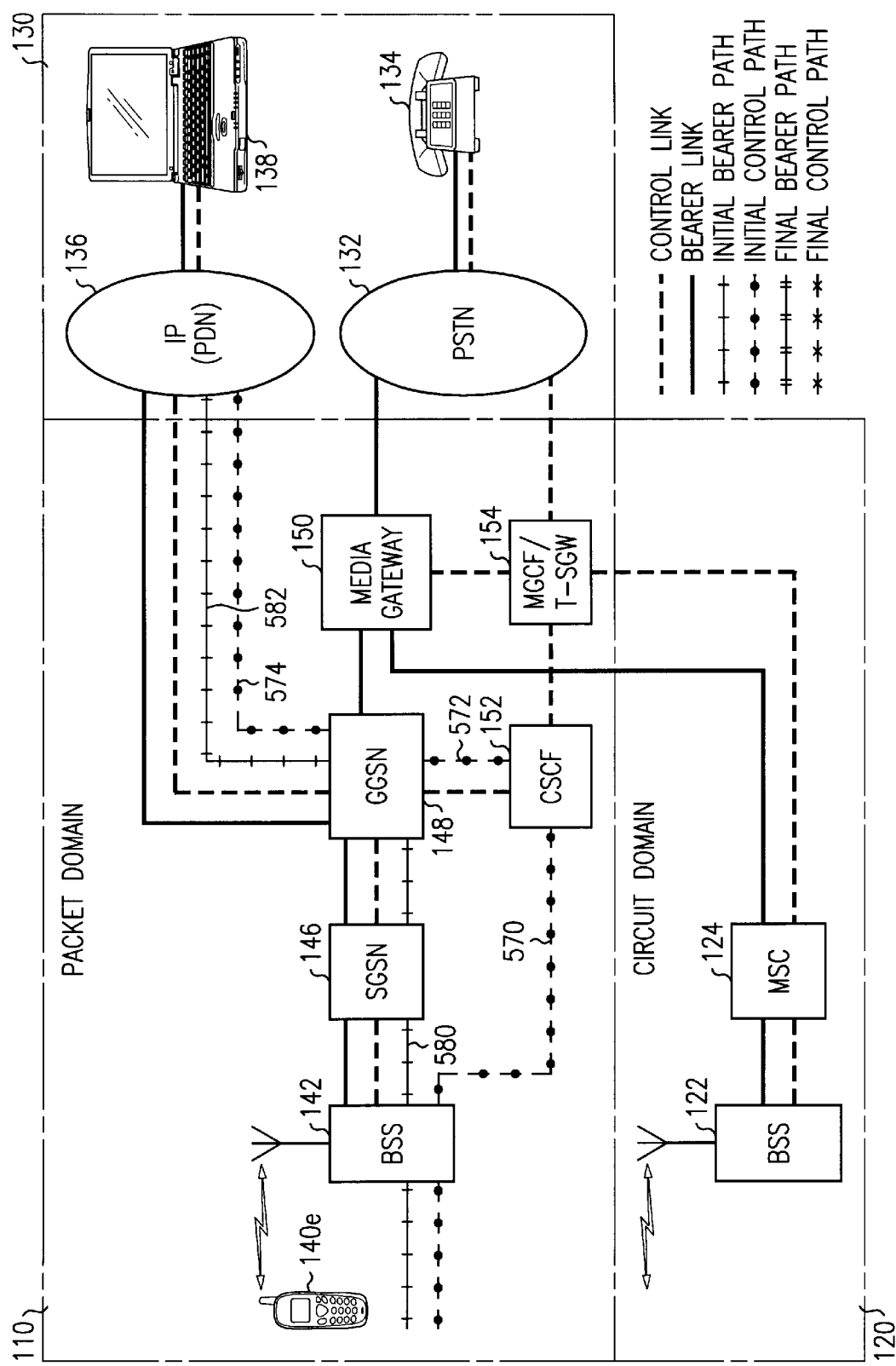
FIG. 5 is a block diagram showing the cooperative wireless network 100 of FIG. 1 depicting, for a call between a wireless terminal and a land-side packet terminal, the initial configuration of control and bearer signal paths prior to a handover from the packet system to the circuit system.
Figure 6:
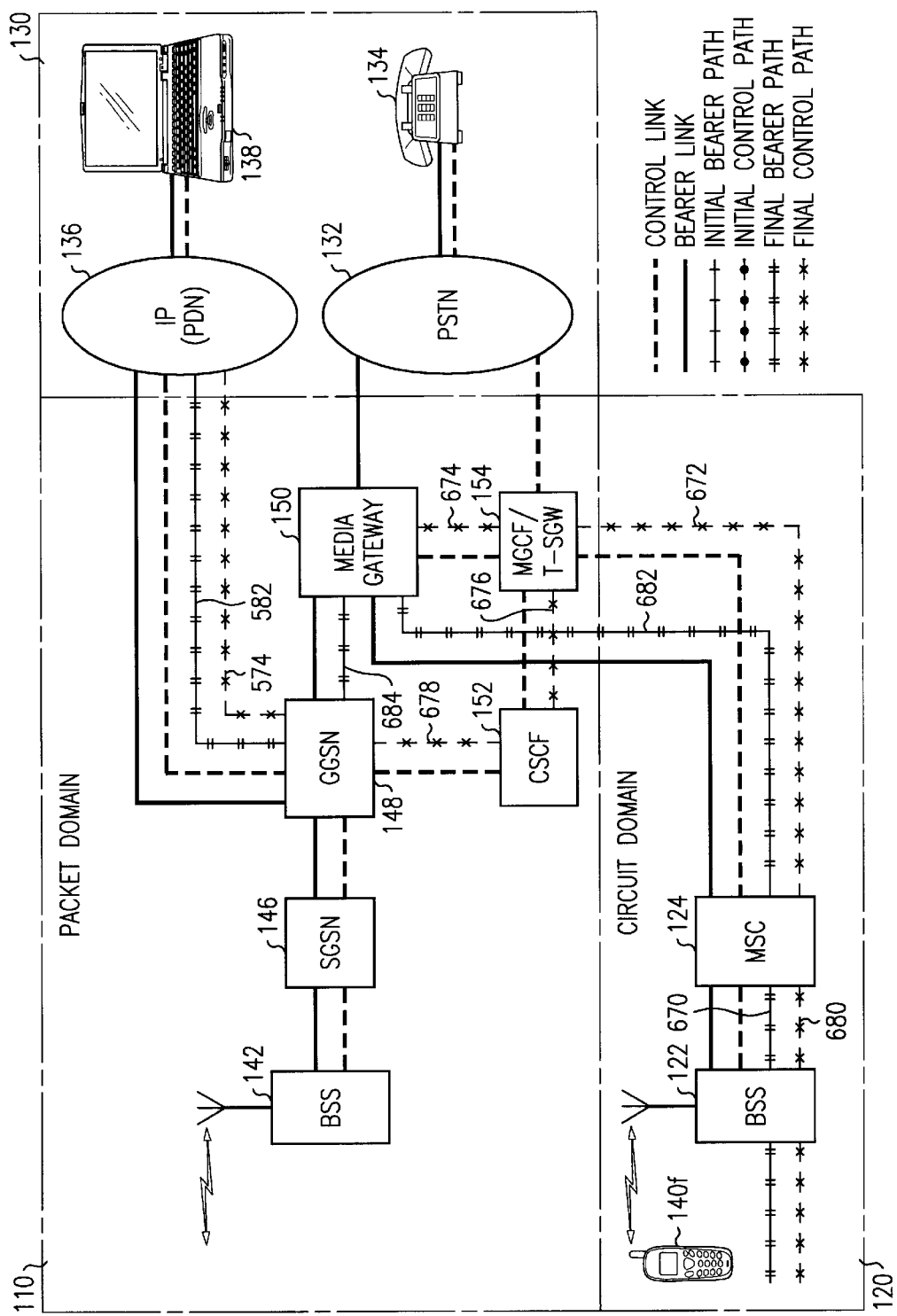
FIG. 6 is a block diagram of the cooperative wireless network 100 of FIG. 1 depicting, for the call of FIG. 5, the final configuration of control and bearer signal paths at the conclusion of a handover from the packet system to the circuit system.

FIGS. 5–6 and 9 are directed to a handover of a call from the packet system 110 to the circuit system 120, where the land-side termination is through a packet network such as PDN 136. Thus, this handover situation contemplates that a stable call has been established between wireless subscriber terminal 140e and land-side subscriber terminal 138, through circuit wireless system 120 and packet land-side network PDN 136.

In order for a handover to occur, a stable call must be established between the wireless terminal 140e to the land-side terminal 138, the configuration of which is best seen in FIG. 5. A control path 570 is present between terminal 140e and CSCF 152. An additional control path 572 extends between CSCF 152 and GGSN 148. A further control path 574 extends between GGSN 148 and packet land-side network PDN 136. All of the aforementioned control paths are packet. A packet bearer path 580 extends between terminal 140e and GGSN 148. A packet bearer path 582 extends between GGSN 148 and packet land-side network PDN 136.

FIG. 9 is a flow diagram showing a method 900 according to an aspect of the present invention for use in conjunction with the cooperative wireless network 100 of FIG. 5 for performing, for a call between a wireless terminal 140 and a land-side packet terminal 138, a handover from the packet system 110 to the circuit system 120. The method begins at step 910, in which packet system 110 determines that a handover is required and an acceptable handover target is a base station 122 in the circuit system 120. See also the discussion of handover determination associated with step 710. This determination may be performed, for example, by the BSS 142 and reported to the CSCF 152. In step 912, the CSCF 152 recognizes that the handover target resides in circuit wireless system 120.

In step 914, CSCF 152 and MGCF/T-SGW 154 instruct MG 150 to establish bearer paths 682 and 684 to carry the call to MSC 124 of circuit system 120, and to perform necessary bearer content conversion. In step 916, MGCF/T-SGW 154 negotiates a handover with system 120 by formatting and initiating the exchange with system 120 of an appropriate handover message sequence. If system 120 uses the ANSI-41 intersystem operations protocol, the handover negotiation may employ the message sequence described in connection with step 714. In step 918, the wireless terminal is instructed by packet system 110 to begin using an assigned traffic channel of the circuit system 120. The wireless terminal executes the instruction. In step 920, the MSC 124 notifies the MGCF/T-SGW 154 that the wireless terminal 140f (see FIG. 6) has handed over successfully to the circuit system 120. In step 922, the resources used by call in the packet system 110 are released, to the extent they are not required to support the connection between MSC 124 of circuit network and the land-side network PDN 136. The bearer path 582 between GGSN 148 and PDN 136 remains in use. The method ends in step 924.

FIG. 6 is a block diagram showing the final configuration of control and bearer paths at the successful completion of a handover from the packet system 110 to the circuit system 120. A bearer path 680 extends from wireless terminal 140f through BSS 122 and MSC 124. A bearer path 682 further extends from MSC 124 to MG 150 of packet system 110. A bearer path 684 further extends from MG 150 to GGSN 148. The bearer path 582 between GGSN 148 and PDN 136, previously used to carry the call when it was carried within the packet network, remains in use. A control path 670 extends from wireless terminal 140f to MSC 124. A control path 672 extends from MSC 124 to MGCF/T-SGW 154 of packet wireless system 110. Additional control paths 674, 676, and 678 respectively link MG 150 to MGCF/T-SGW 154, MGCF/T-SGW 154 to CSCF 152, and CSCF 152 to GGSN 148. The packet signaling control path 574 from GGSN 148 to PDN 136 remains in place. Thus, MGCF/T-SGW 154 and MG 150 cooperate to perform the functions of an anchor MSC for the call which is now largely handled by the circuit system 120.

Although packet wireless system 110 and circuit wireless system 120 are described herein as separate wireless systems, and each system is shown for simplicity in the attached drawings as implemented using elements distinct from those used to implement the other system, it will be appreciated that in some embodiments, the wireless systems 110 and 120 may actually be implemented using elements and components in common. Thus, as implemented in practice, a single component or element may perform selected functions of both wireless systems 110 and 120, and multiple components, elements, and functions may be integrated into a single unit. By way of example but not limitation, a single base station system (which may include shared control and radio elements) may perform the functions of both packet BSS 142 and circuit BSS 122, and that base station system would have connections to both SGSN 146 and MSC 124. Similarly, a single unit could perform the functions of packet SGSN 146, GGSN 148, CSCF 152, MGCF/T-SGW 154, and circuit MSC 124. In such cases, and particularly if the various components are provided by the same vendor, the intersystem interoperations protocols used between these systems may take the form of vendor-defined message protocols, instead of a standardized protocol such as ANSI-41. However, it would still be necessary to implement both packet and circuit call models, and to perform handovers therebetween, as earlier described.

The present application relates to telecommunications systems, including multimedia telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention.

In accord with aspects of the present invention, an improved wireless network and associated methods have been disclosed which provide intersystem handoffs between existing circuit wireless systems and packet systems. The packet wireless system advantageously provides translation between circuit and packet call models and provides conversion of bearer traffic between formats required by circuit and packet systems. A Media Gateway component provides the conversion of bearer traffic between formats used in each system. The Media Gateway, a Media Gateway Control Function, and an associated Call State Control Function, cooperate to emulate the behavior of a circuit wireless system, so that when interoperating with conventional circuit systems, the packet system appears to be another circuit wireless system. Where necessary, the Media Gateway, Media Gateway Control Function, and Call State Control Function further cooperate to emulate the functions of an anchor MSC of a circuit wireless system. The improved network and methods allow handovers to take place between circuit and packet systems while minimizing or avoiding changes to conventional wireless systems.

The above-described embodiment of the invention is merely one example of a way in which the invention may be carried out. Other ways may also be possible and are within the scope of the following claims defining the invention.

What is claimed is:

1. For use in conjunction with a wireless telecommunications network, said network having a portion adapted for packet wireless communications with a terminal and a portion adapted for circuit wireless communications with said terminal, a method for effecting a handover for a call which involves said terminal and another endpoint and which is using one of said portions, such that said call instead uses the other of said portions, comprising the steps of:

sending to said one of said portions a handover request with respect to said call;

emulating behavior of a handover-managing component of said one of said portions; and providing a path for bearer traffic between said terminal and said endpoint through the other of said portions.

2. For use in conjunction with a wireless telecommunications network, said network having first and second portions each adapted for wireless communications with a terminal, said first portion being adapted to use a type of communications selected from the group of packet and circuit, said second portion being adapted to use a type of communications selected from the group of packet and circuit and different from the communications type of said first portion, a method of effecting a handover for a call which involves said terminal and another endpoint and which is using said first portion, such that said call thereafter uses said second portion, comprising the steps of:

a. sending to said second portion a handover request with respect to said call;

b. emulating behavior of a handover-managing component of one of said portions; and c. providing a path for bearer traffic between said terminal and said endpoint through said second portion.

3. The method of claim 2 wherein step b thereof further comprises the step of:

b1. transmitting to said one of said portions messages according to a defined intersystem operations protocol.

4. The method of claim 2 wherein step b thereof further comprises the step of:

b1. Receiving from said one of said portions messages according to a defined intersystem operations protocol.

5. The method of claim 2 wherein step a thereof is performed by said first portion, and step b thereof is performed by said second portion to emulate a handover-managing component of said first portion.

6. The method of claim 2 wherein step a thereof is performed by said first portion, and step b thereof performed by said first portion to emulate a handover managing component of said second portion.

7. The method of claim 2 wherein step b thereof further comprises the step of:
   b1. emulating the behavior of a mobile switching center in a circuit wireless system.

8. The method of claim 2 wherein step b thereof further comprises the step of:
   b1. emulating the behavior of an anchor mobile switching center in a circuit wireless system.

9. The method of claim 2 wherein step c thereof further comprises the step of:
   c1. translating bearer traffic between a form used by said first portion and a form used by said second portion.

10. The method of claim 2 further comprising the step of:
    d. translating call state information between a call model used by said first portion and a call model used by said second portion.

11. The method of claim 2 further comprising the step of:
    d. translating control messages between a form used by said first portion and a form used by said second portion.

12. The method of claim 2 wherein step c thereof further comprises the step of:
    c1. translating bearer traffic between a format used by said second portion and a form used by a network associated with said endpoint.

13. The method of claim 2 wherein step c thereof further comprises the step of:
    c1. translating call state information between a call model used by said second portion and a call model used by a network associated with said endpoint.

14. The method of claim 2 wherein step c thereof further comprises the step of:
    c1. translating control messages between a form used by said second portion and a form used by a network associated with said endpoint.

15. The method of claim 2 wherein said first portion is adapted for packet communications and includes a gateway to translate bearer traffic between a form used by said first portion and a form used by said second portion, and further comprising the step of:
    d. establishing a bearer path to said endpoint through said second portion and said gateway.

16. A telecommunications network for wireless service comprising:
    a first wireless system adapted for communication with a terminal, said first system employing circuit technology;
    a second wireless system adapted for communication with a terminal and said first system, said second system employing packet technology;
    said second system including a media gateway adapted to translate bearer traffic between a form used in said first system and a form used in said second system, and a control device coupled to the media gateway and adapted to translate control traffic between a form used in said first system and a form used in said second system, and a handoff manager coupled to said control device and adapted to emulate the handoff management behavior of a circuit wireless system.

* * * * *